United States Patent
Frahn et al.

(10) Patent No.: US 6,593,393 B2
(45) Date of Patent: Jul. 15, 2003

(54) RADIATION-CURING COATING SYSTEMS

(75) Inventors: Stephanie Frahn, Haibach (DE); Manfred Ettlinger, Karlstein (DE); Jürgen Meyer, Stockstadt/Main (DE)

(73) Assignee: Degussa AG, Dusseldorf (DE)

( * ) Notice: Subject to any disclaimer, the term of this patent is extended or adjusted under 35 U.S.C. 154(b) by 0 days.

(21) Appl. No.: 09/981,719

(22) Filed: Oct. 19, 2001

(65) Prior Publication Data

US 2002/0077381 A1 Jun. 20, 2002

(30) Foreign Application Priority Data

Oct. 21, 2000 (EP) .................................. 00122956

(51) Int. Cl.$^7$ ................................. C08F 2/46
(52) U.S. Cl. .................. 522/83; 522/71; 522/77; 522/120; 522/113; 522/119; 522/114; 522/121; 522/148; 522/172; 427/508; 427/515
(58) Field of Search ................... 522/83, 84, 182, 522/113, 114, 119, 120, 121, 148, 172, 77, 71; 427/508, 515

(56) References Cited

U.S. PATENT DOCUMENTS

| | | | | |
|---|---|---|---|---|
| 4,482,656 A | * | 11/1984 | Nguyen et al. | 523/212 |
| 4,822,828 A | * | 4/1989 | Swofford | 522/84 |
| 5,260,350 A | * | 11/1993 | Wright | 522/42 |
| 5,296,295 A | * | 3/1994 | Perkins et al. | 428/412 |
| 5,374,483 A | * | 12/1994 | Wright | 428/412 |
| 5,470,616 A | * | 11/1995 | Uenishi et al. | 427/515 |
| 5,494,645 A | * | 2/1996 | Tayama et al. | 427/508 |
| 5,607,729 A | | 3/1997 | Medford | |
| 5,614,321 A | | 3/1997 | Medford et al. | |
| 5,959,005 A | | 9/1999 | Hartmann et al. | |

FOREIGN PATENT DOCUMENTS

| | | |
|---|---|---|
| DE | 36 15 790 | 11/1986 |
| DE | 44 17 141 | 12/1994 |
| EP | 0 808 880 | 11/1997 |
| GB | 2 177 093 | 1/1987 |
| WO | WO 81/02579 | 9/1981 |

OTHER PUBLICATIONS

Copy of International Search Report for counterpart application No. EP 00 12 2956 dated May 4, 2001.
L.N. Lewis, D. Katsamberis: "uv–Curable, Abrasion–Resistant and Weatherable Coatings with Improved Adhesion", J. Appl. Polym. Sci., Bd 42, Nr. 6, 1991, Seiten 1551–1556, XP002165547.

* cited by examiner

Primary Examiner—James J. Seidleck
Assistant Examiner—Sanza L. McClendon
(74) Attorney, Agent, or Firm—Smith, Gambrell & Russell

(57) ABSTRACT

Radiation-curing coating systems which contain a silanized silica, where the silane is hexamethyldisilazane, 3-methacryloxypropyltrialkoxysilane and/or glycidyloxypropyltrialkoxysilane as the silanizing agent. The radiation-curing coating systems can be used for coating derived timber boards, solid wood, wood veneers, parquet, decorative papers, decorative films, thermoplastics and thermosetting plastics, mineral and polymeric glasses, metals (for example aluminium, high-grade steel, phosphated, chromated and galvanized steel sheets, copper), lacquered surfaces, printing inks and leather.

9 Claims, No Drawings

RADIATION-CURING COATING SYSTEMS

INTRODUCTION AND BACKGROUND

The present invention relates to radiation-curing coating systems, a process for their preparation and their use.

Radiation-curing coating systems are used to coat surfaces of wood, metals and plastics.

In some formulations the known radiation-curing coating systems have the disadvantage that the surface hardness is inadequate.

It is therefore an object of the present invention to develop radiation-curing coating systems which do not have these disadvantages.

SUMMARY OF THE INVENTION

The above and other objects of the present invention can be achieved by radiation-curing coating systems, which are characterized in that they comprise at least one silanized silica, where a silane from the group consisting of hexamethyldisilazane, 3-methacryloxypropyltrialkoxysilane and/or glycidyloxypropyltrialkoxysilane is used as the silanizing agent.

In a preferred embodiment of the invention, the silanized silica can be structurally modified. A silica such as described in the document EP 0 808 880 A2 can be used as the silanized silica. This document is incorporated herein by reference. The silica according to EP 0 808 880 A2 is a silanized silica with the following physico-chemical properties:

| Specific surface area (BET) | m²/g | 80–400 |
| Primary particle size | nm | 7–40 |
| Tamped density | g/l | 50–300 |
| pH | | 3–10 |
| Carbon content | % | 0.1–15 |
| DBP (dibutylphthalate) number | % | <200 |

This silanized silica is prepared by a process in which a silica is sprayed optionally first with water or dilute acid and then with a surface modification reagent or a mixture of several surface modification reagents in a suitable mixing vessel, with intensive mixing, the components are re-mixed for 15 to 30 minutes and heat-treated at a temperature of 100 to 400° C. over a period of 1 to 6 h, and the silanized silica is then destructured/compacted by mechanical effects and re-ground in a mill.

A silica prepared pyrogenically by the route of flame hydrolysis of $SiCl_4$ can preferably be employed as the silica. Hexamethyldisilazane, for example, can be employed as the surface modification reagent.

The coating according to the invention which can be cured by radiation comprises a reactive binder which contains double bonds in the terminal position or in the β-position relative to a reactive group which can be polymerized by free radicals. The double bonds can cure or polymerize under the influence of UV light or electrons. Copolymerizable reactive thinners (monomers) can be used to lower the viscosity.

Further components can be fillers, flatting agents and/or pigments. If required, wetting agents, flow control and degassing agents and other additives can be used in radiation-curing systems.

In UV technology, photoinitiators or photosensitizers are used to initiate the polymerization. In the case of curing by electron beams, the high-energy radiation itself forms the initiator radicals for the polymerization reaction.

The invention also provides a process for the preparation of the radiation-curing coating systems according to the invention, which is characterized in that 1 to 20%, preferably 2 to 10% of silanized pyrogenic silica, depending on the rheology of the system, is stirred into the coating system.

DETAILED DESCRIPTION OF INVENTION

The coating systems according to the invention can be used for coating a wide variety of surfaces such as derived timber boards, solid wood, wood veneers, parquet, decorative papers, decorative films, thermoplastics and thermosetting plastics, mineral and polymeric glasses, metals (for example aluminium, high-grade steel, phosphated, chromated and galvanized steel sheets, copper), lacquered surfaces, surfaces coated with printing inks and leather.

The radiation-curing coating systems according to the invention have the following advantages:

Improvement in the surface hardness, in particular scratch resistance, without impairment of the application properties, and in the optical properties of the crosslinked coating films.

According to the invention, the pyrogenically prepared silicas according to table 1 can be employed as the silica for the silanization.

Physico-chemical Data of Aerosil

| Test method | | AEROSIL 90 | AEROSIL 130 | AEROSIL 150 | AEROSIL 200 | AEROSIL 300 | AEROSIL 380 | AEROSIL OX50 | AEROSIL TT600 |
|---|---|---|---|---|---|---|---|---|---|
| Behaviour towards water | | | | | hydrophilic | | | | |
| Appearance | | | | | loose white powder | | | | |
| BET surface area[1] | m²/g | 90 ± 15 | 130 ± 25 | 150 ± 15 | 200 ± 25 | 300 ± 30 | 380 ± 30 | 50 ± 15 | 200 ± 50 |
| Average primary particle size | Nm | 20 | 16 | 14 | 12 | 7 | 7 | 40 | 40 |
| Tamped density approx. values[2] | g/l | 80 | 50 | 50 | 50 | 50 | 50 | 130 | 60 |
| compacted goods (added "V") | g/l | 120 | 120 | 120 | 120 | 120 | 120 | | |
| VV goods (added "VV")[12] | g/l g/l | | | 50/75 | 50/75 120 | 50/75 120 | | | |
| Loss on drying[3] (2 hours at 105° C.) on leaving supply works | % | <1.0 | <1.5 | <0.5[9] | <1.5 | <1.5 | <2.0 | <1.5 | <2.5 |
| Loss on ignition[4][7] (2 hours at 1000° C.) | % | <1 | <1 | <1 | <1 | <2 | <2.5 | <1 | <2.5 |

-continued

| Test method | | AEROSIL 90 | AEROSIL 130 | AEROSIL 150 | AEROSIL 200 | AEROSIL 300 | AEROSIL 380 | AEROSIL OX50 | AEROSIL TT600 |
|---|---|---|---|---|---|---|---|---|---|
| pH[5] | | 3.7–4.7 | 3.7–4.7 | 3.7–4.7 | 3.7–4.7 | 3.7–4.7 | 3.7–4.7 | 3.8–4.8 | 3.6–4.5 |
| $SiO_2$[8] | % | >99.8 | >99.8 | >99.8 | >99.8 | >99.8 | >99.8 | >99.8 | >99.8 |
| $Al_2O_3$[8] | % | <0.05 | <0.05 | <0.05 | <0.05 | <0.05 | <0.05 | <0.08 | <0.05 |
| $Fe_2O_3$[8] | % | <0.003 | <0.003 | <0.003 | <0.003 | <0.003 | <0.003 | <0.01 | <0.003 |
| $TiO_2$[8] | % | <0.03 | <0.03 | <0.03 | <0.03 | <0.03 | <0.03 | <0.03 | <0.03 |
| HCl[8)10] | % | <0.025 | <0.025 | <0.025 | <0.025 | <0.025 | <0.025 | <0.025 | <0.025 |
| Sieve residue[8] (Mocker method, 45 µm) | % | <0.05 | <0.05 | <0.05 | <0.05 | <0.05 | <0.05 | <0.2 | <0.05 |
| Drum size (net)[11] | Kg | 10 | 10 | 10 | 10 | 10 | 10 | 10 | 10 |

[1] in accordance with DIN 66131
[2] in accordance with DIN ISO 787/XI, JIS K 5101/18 (not sieved)
[3] in accordance with DIN ISO 787/II, ASTM D 280, JIS K 5101/21
[4] in accordance with DIN 55921, ASTM D 1208, JIS K 5101/23
[5] in accordance with DIN ISO 787/IX, ASTM D 1208, JIS K 5101/24
[6] in accordance with DIN ISO 787/XVIII, JIS K 5101/20
[7] based on the substance dried for 2 hours at 105° C.
[8] based on the substance ignited for 2 hours at 1000° C.
[9] special packaging protecting against moisture
[10] HCl content is a constituent of the loss on ignition
[11] V goods are supplied in sacks of 20 kg
[12] VV goods are currently supplied only from the Rheinfelden works

EXAMPLES

Example 1

A silanized silica is prepared in accordance with example 1 of EP 0 808 880 A2. Aerosil® 200 (silica) is mixed with 4.3 parts water and 18.5 parts HMDS (hexamethyldisilazane) and the mixture is heat-treated at 140° C. The silanized silica is then compacted to approx. 250 g/l on a continuously operating vertical ball mill. Thereafter, the silica is re-ground by means of an air jet mill. The silica obtained has the following properties:

| Example | BET $m^2/g$ | Tamped density | pH | C content | Loss on drying % | Loss on ignition % | DBP number % |
|---|---|---|---|---|---|---|---|
| VT 1128/1 | 145 | 188 | 7.3 | 2.7 | 2.4 | 0.3 | 90 |

Example 2

Aerosil® 200 is mixed with 4 parts water and 18 parts 3-methacryloxypropyltrimethoxysilane and the mixture is heat-treated at 140° C. under an inert gas. The silanized silica is then compacted to approx. 250 g/l on a continuously operating vertical ball mill. The silica obtained has the following properties:

| | |
|---|---|
| BET [$m^2/g$] | 138 |
| Tamped density [g/l] | 242 |
| pH | 4.6 |
| C content | 5.7 |
| Loss on drying [%] | 0.6 |
| Loss on ignition [%] | 8.9 |
| DBP number [%] | 122 |

Experiments With Silica According to Example 2 in UV-curing Binders

Experiment 1

10 % silica according to example 2 are stirred into the binder (ethoxylated pentaerythritoltetracrylate), with a dissolver and then predispersed for 5 min at 3000 rpm (disc Ø 45 mm). The mixture is dispersed in a laboratory bead mill for 20 min at 2500 rpm and a pump output of 40%. 1 mm glass beads are used as the beads. The dispersing quality is checked with a grindometer, 25 µm, in accordance with DIN ISO 1524. It must be smaller than 10 µm.

3% photoinitiator is stirred into the coating. Application is carried out with the aid of a spiral doctor blade (amount applied 36 µm) on black-lacquered metal sheets. Curing is carried out with a UV unit (current uptake of the UV lamp (mercury vapour lamp) 7.5–10 mA, belt speed 10 m/min, irradiation intensity 1 W/cm).

Experiment 2

10% silica according to example 2 are stirred into the binder 2 (Epoxyacrylate A) with a dissolver and then pre-dispersed for 5 min at 3000 rpm (disc Ø45 mm). The mixture is dispersed in a laboratory bead mill for 15 min at 2500 rpm and a pump output of 40%. 1 mm glass beads are used as the beads. The dispersing quality is checked with a grindometer, 25 µm, in accordance with DIN ISO 1524. It must be smaller than 10 µm.

3% photoinitiator is stirred into the coating. Application is carried out with the aid of a spiral doctor blade (amount applied 36 µm) on black-lacquered metal sheets. Curing is carried out with a UV unit (current uptake of the UV lamp (mercury vapour lamp) 7.5–10 mA, belt speed 10 m/min, irradiation intensity 1 W/cm)

Experiment 3

16% silica according to example 2 are stirred into the binder 3 (Epoxyacrylate B) with a dissolver and then pre-dispersed for 5 min at 3000 rpm (disc Ø45 mm). The mixture is dispersed in a laboratory bead mill for 15 min at 2500 rpm and a pump output of 40%. 1 mm glass beads are used as the beads. The dispersing quality is checked with a grindometer, 25 µ, in accordance with DIN ISO 1524. It must be smaller than 10 µm.

3% photoinitiator is stirred into the coating. Application is carried out with the aid of a spiral doctor blade (amount applied 36 pm) on black-lacquered metal sheets. Curing is carried out with a UV unit (current uptake of the TV lamp (mercury vapour larnp) 7.5–10 mA, belt speed 10 m/min, irradiation intensity 1 W/cm).

TABLE 1

Grindometer values, Brookfield viscosities:

|  | Grindo-meter value [µm] | Viscosity [mPa s] 6 rpm | Viscosity [mPa s] 60 rpm | SV 6/60 |
|---|---|---|---|---|
| binder 1 | — | 160 | 158 | 1.0 |
| binder 1 + silica according to example 2 | <10 | 451 | 389 | 1.1 |
| binder 2 | — | 481 | 468 | 1.0 |
| binder 2 + silica according to example 2 | <10 | 1,000 | 950 | 1.1 |
| binder 3 | — | 521 | 494 | 1.1 |
| binder 3 + silica according to example 2 | <10 | 902 | 842 | 1.1 |

Scratching Experiments

The metal sheets are scoured with a quartz/water slurry (100 g water+1 g Marlon A 350, 0.25%+5 g Sikron F500) with 100 strokes with the aid of a scouring and washing resistance testing machine (Erichsen). The shine before and 10 min after scouring is determined with a reflectometer (20° incident angle).

TABLE 2

Reflectometer values before and after scratching:

|  | 20° reflectometer value before | 20° reflectometer value after | Residual shine [%] |
|---|---|---|---|
| binder 1 | 82.0 | 50.0 | 61.0 |
| binder 1 + silica according to example 2 | 80.5 | 65.2 | 81.0 |
| binder 2 | 89.6 | 46.5 | 51.9 |
| binder 2 + silica according to example 2 | 87.8 | 67.4 | 76.8 |
| binder 3 | 88.9 | 62.0 | 69.7 |
| binder 3 + silica according to example 2 | 87.3 | 71.4 | 81.8 |

Example 3

Aerosil® 200 is mixed with 4 parts water and 18 parts 3-methacryloxypropyl-trimethoxysilane (for example DYNASILAN MEMO) and the mixture is heat-treated at 140° C. under an inert gas. The silica obtained has the following properties:

| BET [m$^2$/g] | 138 |
|---|---|
| Tamped density [g/l] | 52 |
| pH | 4.6 |
| C content | 5.7 |
| Loss on drying [%] | 0.8 |
| Loss on ignition [%] | 9.7 |
| DBP number [%] | 228 |

Example 4

Aerosil® 200 is mixed with 3 parts water and 16 parts 3-glycidyloxypropyltrimethoxysilane (for example DYNASILAN GLYMO) and the mixture is heat-treated at 140° C. under an inert gas.

The silica obtained has the following properties:

| BET [m$^2$/g] | 165 |
|---|---|
| Tamped density [g/l] | 53 |
| pH | 4.9 |
| C content | 5.5 |
| Loss on drying [%] | 1.5 |
| Loss on ignition [%] | 8.7 |
| DBP number [%] | 242 |

Further variations and modifications of the foregoing will be apparent to those skilled in the art and are intended to be encompassed by the claims appended hereto.

European priority application 00 122 956.6 of Oct. 21, 2000 is relied on and incorporated herein by reference.

We claim:

1. A radiation-curing coating composition comprising:
   at least one silanized silica, and a polymerizable reactive binder containing double bonds,
   wherein said silanized silica is prepared by a process comprising:
      spraying silica with a silane selected from the group consisting of hexamethyldisilazane, 3-methacryloxypropyltrialkoxysilane, glycidyloxypropyltrialkoxysilane, and mixtures thereof,
      mixing the silica sprayed with silane to form a mixture,
      heat-treating said mixture at a temperature of 100 to 400° C. over a period of 1 to 6 h to form silanized silica,
      compacting the silanized silica, and
      grinding the silanized silica.
2. The radiation-curing coating composition according to claim 1, wherein the silanized silica is structurally modified.
3. The radiation-curing coating composition according to claim 1 which has a grindometer value of less than 10 m.
4. A process for the preparation of a radiation-curing coating composition, comprising:
   combining at least one silanized silica, and a polymerizable reactive binder containing double bonds,
   wherein said silanized silica is prepared by a process comprising:
      spraying silica with a silane selected from the group consisting of hexamethyldisilazane, 3-methacryloxypropyltrialkoxysilane, glycidyloxypropyltrialkoxysilane, and mixtures thereof,
      mixing the silica sprayed with silane to form a mixture,
      heat-treating said mixture at a temperature of 100 to 400° C. over a period of 1 to 6 h to form silanized silica,
      compacting the silanized silica, and
      grinding the silanized silica.
5. A process for the protection of a surface comprising coating a surface with the composition of claim 1 and subjecting the surface to radiation-curing to produce a cured coating on said surface.
6. The radiation-curing coating composition according to claim 1, wherein said silica comprises pyrogenic silica.
7. The radiation-curing coating composition according to claim 6, wherein 1–20% silanized silica is used.
8. The process according to claim 4, wherein said silica comprises pyrogenic silica.
9. The process according to claim 8, wherein 1–20% silanized silica is used.

* * * * *